Dec. 19, 1933.   L. A. DUMSER ET AL   1,940,403
LATHE
Filed Nov. 30, 1931   3 Sheets-Sheet 1
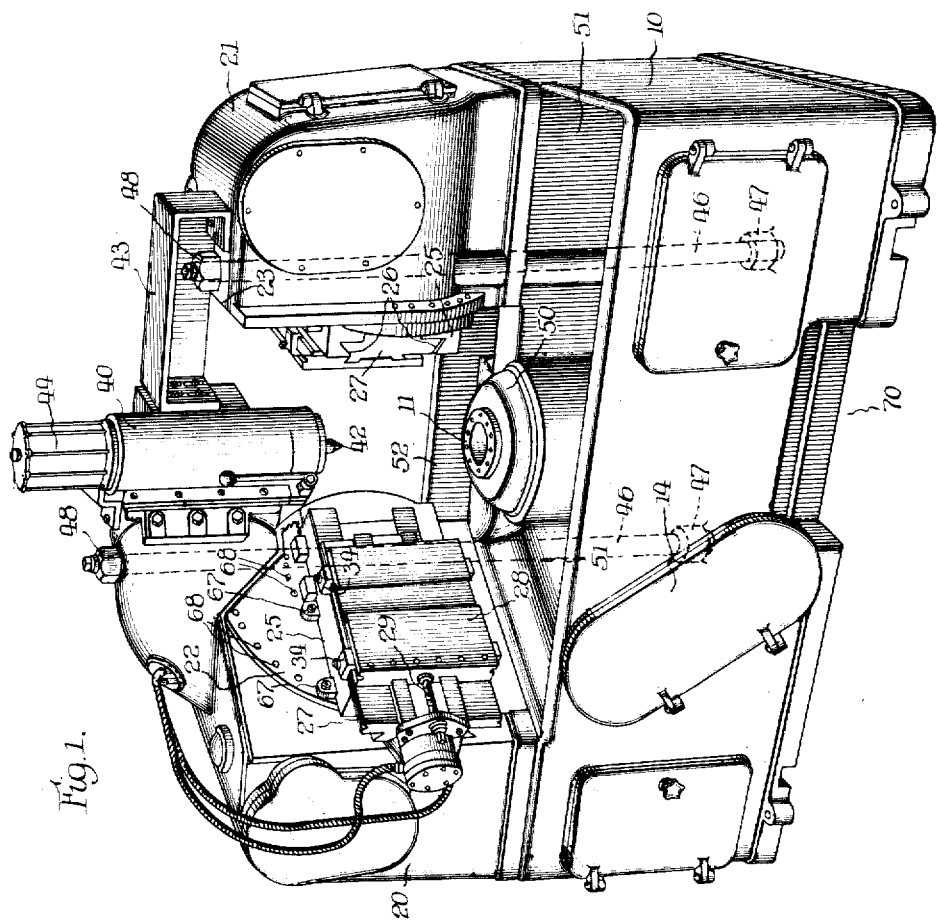
Inventors:
Leo A. Dumser,
Clement J. Schroeder,

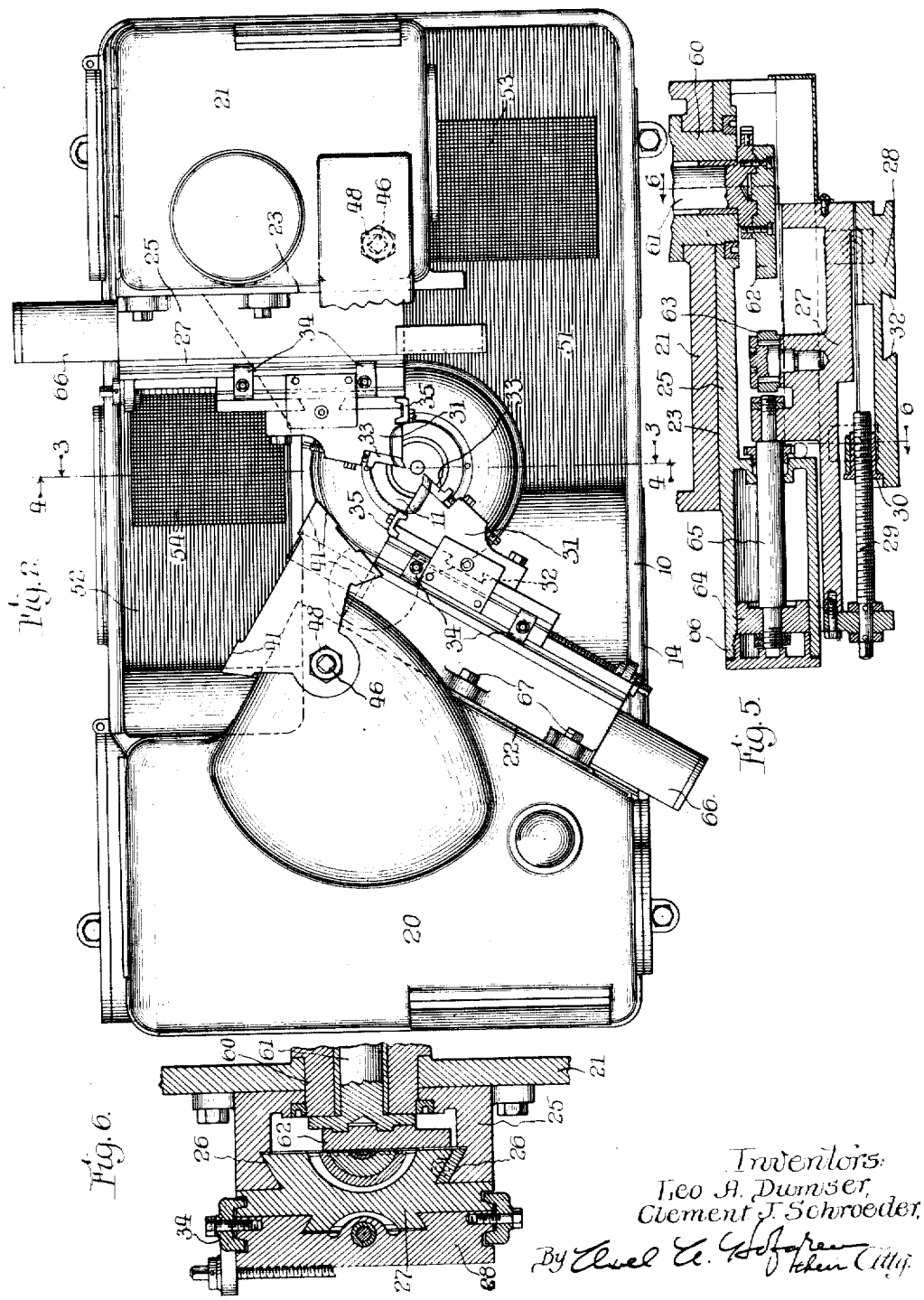

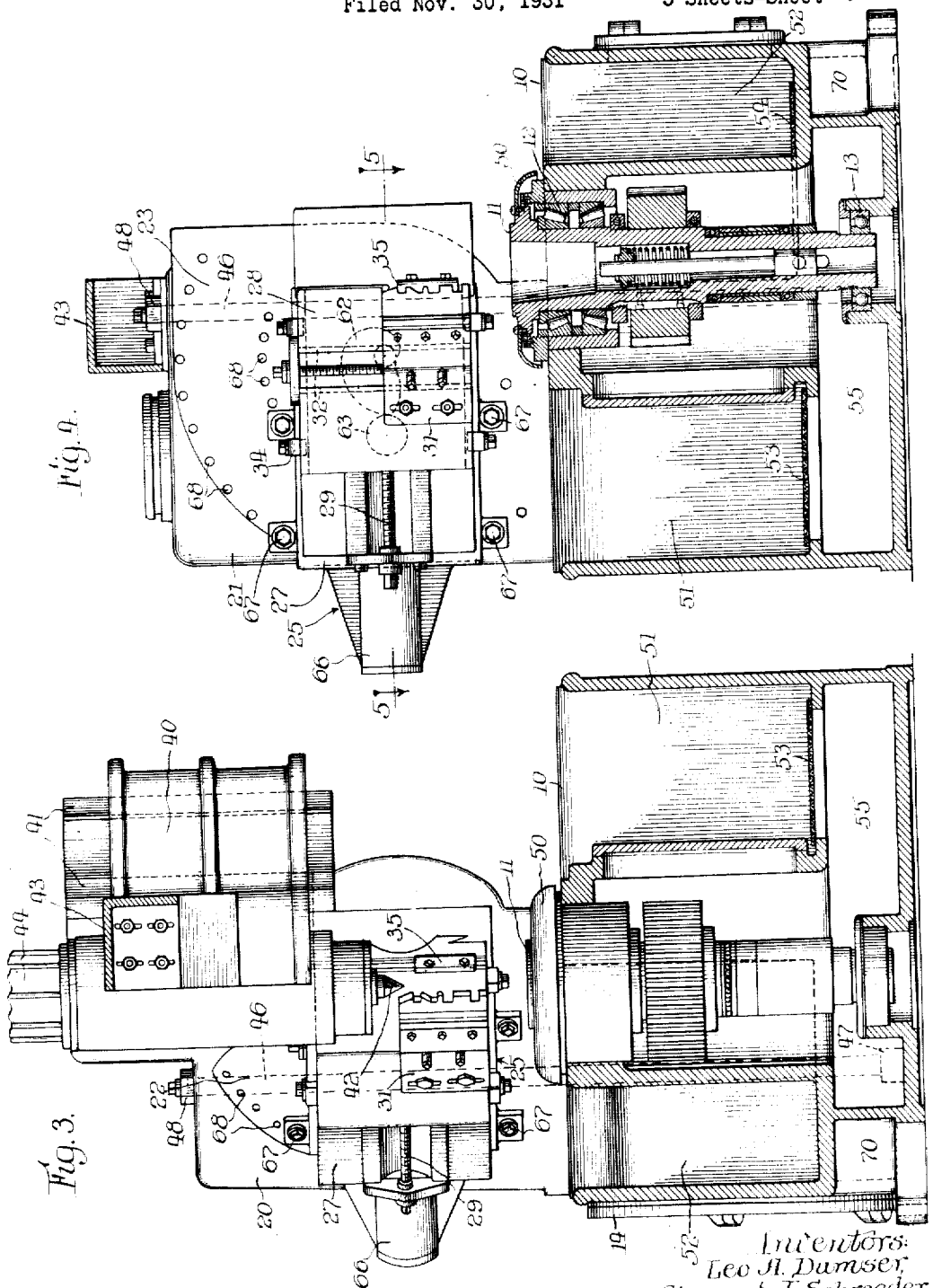

Patented Dec. 19, 1933

1,940,403

UNITED STATES PATENT OFFICE 1,940,403

LATHE

Leo A. Dumser and Clement J. Schroeder, Rockford, Ill., assignors to Sundstrand Machine Tool Co., Rockford, Ill., a corporation of Illinois Application November 30, 1931
Serial No. 577,928

19 Claims. (Cl. 82—2)

The invention relates generally to lathes and more particularly to a vertical lathe. It is the general object of the invention to provide a lathe of new and improved construction capable of performing heavy turning, facing, or forming operations, and of a simple, rugged and compact unit type of construction which provides for ease of manufacture and erection, and facilitates modification to meet special requirements.

Another object is to provide such a lathe so arranged that work blanks of relatively large size may be readily mounted therein.

Other objects include the provision of a vertical lathe of simplified construction having the frame elements and tool supports efficiently arranged so as to permit a marked reduction in the size of floor space necessary for the machine; the provision of a novel and efficient adjustable supporting means for the tools; the provision of separate chip-receiving recesses for the different sets of tools; and the arrangement of the frame elements and tool and work supports so that they may be driven by independent power sources to provide a greater flexibility of erection, set-up and operation.

Another object of the invention is to provide a new and improved lathe which is suitable for use with super-speed alloy tools. Such tools are extremely hard and brittle, and in order to insure a long life thereof and to obtain the utmost in production it is necessary to provide a highly improved supporting means for the tools. In attaining this result the invention has for an object the provision of a new and improved lathe embodying a plurality of independently mounted tool supports together with frame elements on which the supports are mounted, arranged so that when the tools carried by the supports are in operation on a work piece the supports will be in compression substantially perpendicularly against the supporting surfaces of the frame elements, and there is no overhang of the tools beyond that necessary for their entrance into the work piece.

It is a well known characteristic of castings that while they are extremely effective against compressive stresses they are quite weak in tension, and it is therefore an object of the invention to unite the stationary frame elements of the machine, which are in the form of castings, by means including large tension rods which extend substantially through adjacent frame elements and are anchored at their opposite ends to the elements so as to be in tension, these rods being positioned closely adjacent and in back of the tool supports so as to pass substantially through the points of maximum tension and reinforce the frame elements and provide a rigid backing for the tools.

Another object of the invention is to provide a lathe embodying a work supporting spindle and a plurality of independent tool supports in which the frame structure for mounting said parts is so arranged that the chips from the tools on said supports fall away from the tools and supports in directions so that they do not lodge on the supports or on the work spindle, and furthermore to provide a vertical lathe of this character wherein the work supporting spindle is mounted substantially centrally of the base and intermediate the tool supports and has an upper end shaped so as to dislodge, during rotation, any chips which may fall thereon, and the frame structure is provided with large chip-receiving recesses adjacent the spindle so that the chips fall away from both tool supports and directly into these recesses. A lathe embodying these features overcomes the difficulties encountered with present day constructions wherein either the spindle or one of the tool supports is usually so positioned that the chips fall thereon and must be removed manually by the operator. Inasmuch as high production machines remove large quantities of metal in a short time it is of decided advantage to have provision made for the complete removal of chips from the tool and work supports so that they are at all times clear.

It is also an object of the invention to provide a vertical lathe embodying a pair of frame elements uprising from a base in substantially diametrically opposed relation with respect to the work supporting spindle and having tool supports mounted on their adjacent sides in such a manner that when the lathe is in operation on a work piece, the supports will be in compression against the frame elements in lines substantially perpendicular to the surfaces on which the tool supports are mounted.

A more specific object is to provide such a vertical lathe embodying a substantially rectangular base in which the columns extend upwardly from the rear right-hand and front left-hand corners of the base and having the work supporting spindle mounted therebetween, the rear column having a tool support mounted on a surface substantially parallel to the ends of the base, and the front column having a beveled surface on which a tool support is mounted so as to provide greater clearance at the front of the machine to facilitate loading work pieces therein.

Further objects and advantages will become apparent from the following detailed description taken in connection with the accompanying drawings, in which:

Fig. 1 is a front perspective view of a preferred form of the invention with the tool holders removed.

Fig. 2 is a plan view thereof with the tailstock supporting structure removed.

Fig. 3 is a vertical section approximately along the line 3—3 of Fig. 2.

Fig. 4 is a vertical section approximately along the line 4—4 of Fig. 2.

Fig. 5 is a section along the line 5—5 of Fig. 4.

Fig. 6 is a section along the line 6—6 of Fig. 5.

While we have shown in the drawings and shall herein describe in detail a preferred form of the invention as embodied in a vertical lathe, it is to be understood that we do not thereby intend to limit the invention to the particular construction and arrangement shown, it being contemplated that various changes may be made by those skilled in the art without departing from the spirit and scope of the invention as expressed in the appended claims.

In the form illustrated in the drawings, the invention is disclosed as comprising a substantially rectangular supporting frame element or base 10 having a work supporting spindle 11 rotatably mounted on a vertical axis positioned somewhat centrally of the base, by means of bearings 12 and 13. This spindle is arranged to be driven by means of a motor (not shown) which may be mounted in the base and connected to the spindle by means of suitable gearing including a plurality of pick-off gears mounted behind a swingable cover plate 14. The spindle is preferably driven in a clockwise direction looking at Figs. 1 and 2.

A pair of vertically extending frame elements or columns 20 and 21 are mounted on the base 10 and extend upwardly therefrom to serve as a support for the tool slides and also to serve as a housing for the tool slide driving mechanisms. These frame elements are preferably positioned on opposite sides of the spindle 11 and as illustrated herein the element 20 is mounted at the left-hand end of the base (Figs. 1 and 2) and the element 21 is mounted on the rear right-hand corner of the base. The tool slide supporting surfaces on these frame elements are so arranged that during the operation of the machine the tool slides are in compression and the forces thereagainst act in a direction substantially perpendicular to the surfaces on the frame elements. Thus as illustrated most clearly in Figs. 1 and 2 the frame element 20 has a tool slide supporting surface 22 on the side adjacent the spindle and the frame element 21 has a tool slide supporting surface 23 also on the side adjacent the spindle. Preferably the left-hand frame element 20 is provided with a beveled surface so as to provide greater accessibility to the spindle from the front of the machine.

The tool supporting structures disclosed herein, as illustrated most clearly in Figs. 5 and 6, are duplicates, and comprise generally a swivel base 25 provided with longitudinally extending ways 26, a slide 27 movably mounted on the ways 26, a support 28 adjustable longitudinally on the slide by means of an adjusting screw 29 journalled on the slide and engaging a nut 30 on the support, a transversely movable member 31 mounted on ways 32 on the support 28, and a longitudinally adjustable tool holder 33 mounted on the transversely movable member 31. Preferably channel-like clamping members 34 are provided for securing the support 28 to the tool slide 27, and similar clamping members 35 may be provided for clamping the front end of the transversely movable member 31 to the support 28 in order to provide an extremely rigid structure.

The bases 25 are pivotally mounted on the vertical frame elements 20 and 21 so that they may be adjusted to different angles. As illustrated in the drawings the front swivel base 25 on the left-hand column may be pivoted from the horizontal position illustrated in Fig. 1 through an angle of 45°, and the rear swivel base on the right-hand column may be pivoted from the horizontal position illustrated in Fig. 1 through an angle of 90°. Thus the tool slides may both move transversely of the spindle axis or if desired at an angle thereto, and furthermore the rear base 25 may be adjusted so that the slide 27 carried thereby moves longitudinally of the spindle. This permits the machine to be used for turning operations as well as forming operations.

A tailstock is preferably provided so as to permit of mounting work pieces by means of a tailcenter. As illustrated herein a tailstock 40 is adjustably mounted on vertical ways 41 (Fig. 2) formed on the upper end of the frame element 20, and is provided with a rotatably mounted center 42 alined with the spindle 11. If desired a bracket 43 may be provided for connecting the tailstock with the upper end of the frame element 21 so as to provide a more rigid structure. The center is preferably mounted on a sleeve connected to a piston (not shown) in a cylinder 44 so that it may be reciprocated by means of a pressure fluid.

It is believed readily apparent, and particularly by referring to Fig. 2, that during the operation of the machine, with the work rotating in a clockwise direction, the tool slides and bases are in compression against the supporting surfaces on the frame elements in lines substantially perpendicular thereto, the said supporting surfaces being substantially perpendicular to a tangent through the point of contact of the tools on the work piece. Furthermore there is no overhang of the tools beyond that necessary for their entrance into the work piece when cutting relatively close to the axis. This effectively eliminates chatter of the tools and permits of more rapid removal of the metal.

As illustrated in the drawings the base 10 and frame elements 20 and 21 are formed as separate castings in order to facilitate manufacture and assembly. To provide an even more rigid backing for the tools than that obtained by securing the frame elements 20 and 21 to the base by means of a plurality of short bolts between lugs on the parts (not shown), the invention preferably provides relatively large tension elements or rods 46 which extend vertically through the frame elements 20 and 21 and downwardly through the base 10, the lower ends of the rods being suitably threaded and anchored in threaded bushings 47 cast integrally with the base adjacent the bottom thereof. At their upper ends these rods are provided with nuts 48 which may be tightened against the upper surface of the frame elements so as to place the rods in tension and reinforce the frame elements and base against tensile strains during the cutting operation. As illustrated most clearly in Fig. 2 these rods are positioned so as to be in back of the tool ends of the tool supports and substantially at the points of maximum tension.

The spindle 11 is preferably provided with a shield or guard 50 which rotates therewith and effectively prevents chips and coolant from getting into the spindle bearings, and in order to provide for a rapid removal of the chips the base 10 is formed with large and deep recesses 51 and 52 in the portions not covered by the frame elements 20 and 21. As illustrated most clearly in Figs. 1 to 4, these recesses are to the front and rear of the spindle and are so positioned that the chips from the front and rear cutting tools tend to curl and fall into the respective recesses. The recesses extend substantially up to the guard 50 so that practically no ledge is left on which chips may rest. The chip-receiving recesses are preferably drained at the lower ends through screens 53 and 54 so as to permit the cutter coolant to flow back into the lower portion 55 of the base. With individual chip-receiving recesses for the front and rear tools it is possible to keep the chips separated. This is of particular advantage when the chips from the front and rear tools are of different metals.

As illustrated most clearly in Figs. 4 to 6, the rear base 25 is pivotally mounted on the frame element 21 by means of a bushing 60 through which a driven shaft 61 extends. A cam 62 is carried on this shaft and is arranged to be engaged by a follower roll 63 mounted on the slide 27. The tool slide is arranged to be reciprocated by means of a piston 64 which is connected to the slide by means of a piston rod 65 and is mounted in a cylinder 66 formed on the base 25. In the exemplary form of the invention the flow of fluid to the cylinder and the driving means for the cam are preferably so coordinated that the piston will act to advance the slide rapidly at a traverse rate until the follower 63 engages the cam 62. Thereafter the feeding movement of the slide is controlled by the cam. Upon the completion of the cutting operation fluid supplied to the opposite end of the cylinder returns the slide at a rapid traverse rate to its original position. It will be obvious that with this type of drive the tool support may be readily operated in a horizontal position such as shown in Fig. 4, or in any other position between the horizontal and vertical, the gearing to the cam (not shown) being arranged so that the initial position of the cam may be adjusted to compensate for the angular position of the slide. Preferably bolts 67 are provided for securing the base 25 to the supporting frame element and a plurality of tap holes 68 are provided in the frame element spaced apart at desired intervals so as to enable the base to be readily adjusted to any desired position.

The base and the frame elements 20 and 21 are preferably hollow so that the base may contain a driving motor and gearing for the spindle, and the frame elements may contain also driving motors and gearing for the tool supports. Because of the arrangement of the supporting surfaces on the columns for backing up the tool supports which are in compression during operation, and the provision of the tension rods extending through the columns and base an extremely rigid structure is obtained. Furthermore there is no overhang of tools. The provision of swivel bases for the tool slides enables the machine to be used for either turning or forming operations or combinations of both, and the bases may be readily adjusted to the most suitable angles for the particular tool applications.

The machine is extremely efficient as to floor space when compared to present day machines of equal power. The reduction in size together with various other advantageous features hereinbefore mentioned makes the machine easy to operate. The operator is permitted to stand within a short distance of the spindle center when loading the machine, thereby making it unnecessary for him to lean over to any great extent. Preferably a recess 70 is provided in the front of the base adjacent the floor so as to permit an operator to stand up against the front of the machine with his toes in this recess. Furthermore the provision of large and separate chip-receiving recesses facilitates the removal of the finished work piece and the insertion of a new one, since the adjacent parts of the machine are free from chips.

We claim as our invention:

1. A vertical lathe having, in combination, a substantially rectangular base, a work spindle rotatably mounted on a vertical axis substantially centrally of said base, a column uprising from the rear right-hand corner of said base and having a supporting surface on the left-hand side thereof substantially parallel to the ends of the base, a swivel base mounted on the supporting surface of said column for movement from a horizontal to a vertical position, a tool support movably mounted on said base, a second column uprising from the forward left-hand corner of said base and having a beveled supporting surface on its spindle side, a swivel base on said beveled supporting surface, and a tool support movably mounted on said base.

2. A vertical lathe having, in combination, a substantially rectangular base, a work spindle rotatably mounted on a vertical axis substantially centrally of said base and adapted to rotate in a clockwise direction, a column uprising from the rear right-hand corner of said base and having a supporting surface on the left-hand side thereof substantially parallel to the ends of the base, a tool support movably mounted on said surface, a second column uprising from the forward left-hand corner of said base and having a beveled supporting surface on its spindle side to facilitate access to the spindle, and a tool support movably mounted on said beveled supporting surface.

3. A vertical lathe having, in combination, a rectangular base, a work supporting spindle rotatably mounted on said base on a vertical axis, a frame element uprising from the front portion of said base on one side of said spindle and having a bevelled supporting surface on one side thereof, a swivel base adjustably mounted on said surface, a reciprocatory tool slide on said base, a tool mounted on said slide for engaging a work piece secured to said spindle, said supporting surface being substantially perpendicular to a tangent through the point of contact of said tool on said work piece and positioned so said swivel base will be in compression against said surface.

4. A lathe having, in combination, a first frame element, a work supporting spindle rotatably mounted on said frame element, a second frame element extending from said first frame element on one side of said spindle and having a supporting surface on one side thereof, a tool support movably mounted on said surface, a tool mounted on said support for engaging a work piece secured to said spindle, a third frame element extending from said first frame element adjacent said spindle substantially diametrically opposite said second frame element and having a supporting surface, a tool support movably mounted on said surface, a tool mounted on said support for engaging a work piece secured to said spindle, said supporting surfaces being substantially perpendicular to tangents through the points of contact of said tools on said work piece and positioned so that the tool supports will both be in compression thereagainst.

5. A vertical lathe having, in combination, a base, a vertical work spindle rotatably mounted on said base, a column uprising from said base on one side of said spindle and having a supporting surface thereon, a swivel support mounted on said supporting surface, a tool slide movably mounted on said swivel support, a second column uprising from said base on the other side of said spindle, and a tool support movably mounted on said second column, said swivel support being adjustable from a horizontal position to a vertical position, the columns having supporting surfaces for the supports positioned so that during cutting operations said supports will be in compression substantially perpendicularly against said surfaces.

6. A vertical lathe having, in combination, a base, a work supporting spindle rotatably mounted on said base on a vertical axis, a column uprising from said base on one side of said spindle and having a supporting surface on one side thereof, a tool support movably mounted on said surface, a tool mounted on said support for engaging a work piece secured to said spindle, a second column uprising from said base adjacent said spindle and having a second supporting surface, a second tool support movably mounted on said surface, and a second tool mounted on said support for engaging a work piece secured to said spindle, said supporting surfaces being substantially perpendicular to tangents through the points of contact of said tools on the work piece.

7. A vertical lathe having, in combination, a base, a work supporting spindle rotatably mounted in said base on a vertical axis, a pair of frame elements uprising from said base on substantially diametrically opposite sides of said spindle and having supporting surfaces, tool supports movably mounted on the surfaces of said elements, tools mounted on said supports for engaging a work piece secured to said spindle, said surfaces being substantially perpendicular to tangents through the points of contact of said tools on said work piece, and positioned so that when the tools are operating on a work piece the supports will be in compression substantially perpendicularly against said frame elements.

8. A vertical lathe having, in combination, a base, a work supporting spindle rotatably mounted in said base on a vertical axis, a pair of frame elements uprising from said base adjacent said spindle and provided with tool support mounting surfaces, tool supports movably mounted on said surfaces of said frame elements, and tools mounted on said supports for engaging a work piece secured to said spindle, said supporting surfaces being substantially perpendicular to tangents through the points of contact of said tools on a work piece, and being positioned so that when the tools are operating on a work piece the supports will be in compression substantially perpendicularly against said surfaces of the frame elements.

9. A lathe having, in combination, a pair of laterally spaced substantially parallel frame elements provided with tool supporting mounted surfaces, means connecting adjacent ends of said elements, a work supporting spindle rotatably mounted on said means, tool supports movably mounted one on each of said elements and against said surfaces, tools carried on said supports for engaging a work piece secured to said spindle, said tool supports supporting mounting surfaces being positioned so that when the tools are operating on a work piece the supports will be in compression substantially perpendicularly against the respective surfaces on said frame elements.

10. A vertical lathe comprising, in combination, a substantially rectangular base, a hollow frame element uprising from one end of said base and detachably secured thereto, a second hollow frame element uprising from the other end of the base and detachably secured thereto, a spindle rotatably mounted on a vertical axis in said base, tools, and swivel supports for said tools mounted on said frame elements arranged so that when the tools on the supports operate on a work piece carried on said spindle the supports are in compression against said frame elements.

11. A vertical lathe comprising, in combination, a substantially rectangular base, a hollow frame element uprising from one end of said base and detachably secured thereto, a second hollow frame element uprising from the other end of the base and detachably secured thereto, said elements having flat surfaces thereon for mounting tool supports, a spindle rotatably mounted in said base on a vertical axis, tool supports movably mounted on said surfaces and arranged so that when tools on said supports operate on a work piece carried on said spindle the supports are both in compression against said frame elements.

12. A vertical lathe having, in combination, a base, columns uprising from the opposite ends of said base and providing mounting surfaces for tool supports, tool supports movably mounted on said surfaces, a spindle rotatably mounted in said base on a vertical axis intermediate said columns, said base having a chip-receiving recess in one portion thereof arranged to receive only the chips from the tools on one of said tool supports, and a separate chip-receiving recess arranged to receive only the chips from the tools on another tool support.

13. A vertical lathe having, in combination, a base, two tool supports movably mounted thereon, and a spindle rotatably mounted in said base on a vertical axis, said base having a chip-receiving recess to one side of said spindle arranged to receive the chips from the tool on one of said tool supports and a separate chip-receiving recess on the opposite side of the spindle arranged to receive the chips from the tools on the other of said tool supports.

14. A vertical lathe having, in combination, a base, a vertical work spindle rotatably mounted on said base, a frame element uprising from said base on one side of said spindle and having a supporting surface thereon, a swivel base mounted on said supporting surface, a tool support movably mounted on said swivel base, a second frame element uprising from said base on the other side of said spindle, a second swivel base mounted on said second frame element, and a tool support movably mounted on said second swivel base, one of said swivel bases being adjustable from a horizontal position to a vertical position, the frame elements having supporting surfaces for the swivel bases positioned so that during cutting operations the swivel bases will be in compression substantially perpendicularly against said surfaces.

15. A vertical lathe having, in combination, a substantially rectangular base, a work spindle rotatably mounted on a vertical axis substantially centrally of said base and adapted to rotate in a clockwise direction, a frame element extending upwardly from the rear right-hand corner of said base and having a supporting surface on the left-hand side thereof substantially parallel to the ends of the base, a tool support movably mounted on said surface, a second frame element uprising from the forward left-hand corner of said base and having a bevelled supporting surface on its spindle side to facilitate access to the spindle, a second tool support movably mounted on said bevelled supporting surface, and means securing said frame elements to said base including tension rods anchored at their lower ends in said base and extending upwardly through said frame elements in back of the tool supports substantially through the points of maximum stress, and adjustable means on the upper ends of said rods for clamping the frame elements to the base and placing the rods under tension.

16. A vertical lathe having, in combination, a base, a work supporting spindle rotatably mounted in said base on a vertical axis, a pair of frame elements uprising from said base on substantially diametrically opposite sides of said spindle and having supporting surfaces, tool supports movably mounted on the surfaces of said elements, tools mounted on said supports for engaging a work piece secured to said spindle, said surfaces being substantially perpendicular to tangents through the points of contact of said tools on said work piece and positioned so that when the tools are operating on a work piece the supports will be in compression substantially perpendicularly against said frame elements, a pair of large vertical tension rods extending upwardly through said base and frame elements, one in back of the tool end of each support, and substantially through the points of maximum tension so as to reinforce the cast structure of the machine, and means for securing the ends of said rods to the base and to the frame elements and placing the rods under tension.

17. A lathe having, in combination, a first frame element, a work supporting spindle rotatably mounted on said element, a pair of frame elements extending from said first frame element on substantially diametrically opposite sides of said spindle and having supporting surfaces, tool supports movably mounted on said surfaces, tools mounted on said supports for engaging a work piece secured to said spindle, said surfaces being substantially perpendicular to tangents through the points of contact of said tools on said work piece and positioned so that when the tools are operating on a work piece the supports will be in compression substantially perpendicularly against said frame elements, a pair of tension rods extending through said frame elements substantially through the points of maximum stress and into said first frame so as to increase the tensile strength and reinforce the frame parts of the machine, and adjustable means secured to the upper ends of said rods for engaging the frame elements and placing the rods under tension.

18. A vertical lathe having, in combination, a base, two tool supports movably mounted thereon, and a work support rotatably mounted in said base on a vertical axis adjacent said supports and having its upper end tapering downwardly from the center so that any chips falling thereon will be deflected therefrom, said base having a chip-receiving recess to one side of said spindle arranged to receive the chips from the tool on one of said supports, and a separate chip-receiving recess on the opposite side of the spindle arranged to receive the chips from the tool on the other of said tool supports.

19. A vertical lathe having, in combination, a substantially rectangular base, a vertical work supporting spindle positioned substantially centrally of said base, a pair of frame elements uprising from diagonally opposite corners of said base, and tool supports movably mounted on said frame elements, said base having a chip-receiving recess extending in front of the spindle and one of said frame elements, and another chip-receiving recess extending in the rear of the spindle and the other of said frame elements.

LEO A. DUMSER.
CLEMENT J. SCHROEDER.

CERTIFICATE OF CORRECTION.

Patent No. 1,940,403.  December 19, 1933.

LEO A. DUMSER, ET AL.

It is hereby certified that error appears in the printed specification of the above numbered patent requiring correction as follows: Page 4, line 77, claim 9, for "supporting mouated" read support mounting; and line 84, for "supports supporting" read support; and that the said Letters Patent should be read with these corrections therein that the same may conform to the record of the case in the Patent Office.

Signed and sealed this 11th day of September, A. D. 1934.

(Seal)  Acting Commissioner of Patents,
Leslie Frazer position, the frame elements having supporting surfaces for the swivel bases positioned so that during cutting operations the swivel bases will be in compression substantially perpendicularly against said surfaces.

15. A vertical lathe having, in combination, a substantially rectangular base, a work spindle rotatably mounted on a vertical axis substantially centrally of said base and adapted to rotate in a clockwise direction, a frame element extending upwardly from the rear right-hand corner of said base and having a supporting surface on the left-hand side thereof substantially parallel to the ends of the base, a tool support movably mounted on said surface, a second frame element uprising from the forward left-hand corner of said base and having a bevelled supporting surface on its spindle side to facilitate access to the spindle, a second tool support movably mounted on said bevelled supporting surface, and means securing said frame elements to said base including tension rods anchored at their lower ends in said base and extending upwardly through said frame elements in back of the tool supports substantially through the points of maximum stress, and adjustable means on the upper ends of said rods for clamping the frame elements to the base and placing the rods under tension.

16. A vertical lathe having, in combination, a base, a work supporting spindle rotatably mounted in said base on a vertical axis, a pair of frame elements uprising from said base on substantially diametrically opposite sides of said spindle and having supporting surfaces, tool supports movably mounted on the surfaces of said elements, tools mounted on said supports for engaging a work piece secured to said spindle, said surfaces being substantially perpendicular to tangents through the points of contact of said tools on said work piece and positioned so that when the tools are operating on a work piece the supports will be in compression substantially perpendicularly against said frame elements, a pair of large vertical tension rods extending upwardly through said base and frame elements, one in back of the tool end of each support, and substantially through the points of maximum tension so as to reinforce the cast structure of the machine, and means for securing the ends of said rods to the base and to the frame elements and placing the rods under tension.

17. A lathe having, in combination, a first frame element, a work supporting spindle rotatably mounted on said element, a pair of frame elements extending from said first frame element on substantially diametrically opposite sides of said spindle and having supporting surfaces, tool supports movably mounted on said surfaces, tools mounted on said supports for engaging a work piece secured to said spindle, said surfaces being substantially perpendicular to tangents through the points of contact of said tools on said work piece and positioned so that when the tools are operating on a work piece the supports will be in compression substantially perpendicularly against said frame elements, a pair of tension rods extending through said frame elements substantially through the points of maximum stress and into said first frame so as to increase the tensile strength and reinforce the frame parts of the machine, and adjustable means secured to the upper ends of said rods for engaging the frame elements and placing the rods under tension.

18. A vertical lathe having, in combination, a base, two tool supports movably mounted thereon, and a work support rotatably mounted in said base on a vertical axis adjacent said supports and having its upper end tapering downwardly from the center so that any chips falling thereon will be deflected therefrom, said base having a chip-receiving recess to one side of said spindle arranged to receive the chips from the tool on one of said supports, and a separate chip-receiving recess on the opposite side of the spindle arranged to receive the chips from the tool on the other of said tool supports.

19. A vertical lathe having, in combination, a substantially rectangular base, a vertical work supporting spindle positioned substantially centrally of said base, a pair of frame elements uprising from diagonally opposite corners of said base, and tool supports movably mounted on said frame elements, said base having a chip-receiving recess extending in front of the spindle and one of said frame elements, and another chip-receiving recess extending in the rear of the spindle and the other of said frame elements.

LEO A. DUMSER.
CLEMENT J. SCHROEDER.

CERTIFICATE OF CORRECTION.

Patent No. 1,940,403.  December 19, 1933.

LEO A. DUMSER, ET AL.

It is hereby certified that error appears in the printed specification of the above numbered patent requiring correction as follows: Page 4, line 77, claim 9, for "supporting mouated" read support mounting; and line 84, for "supports supporting" read support; and that the said Letters Patent should be read with these corrections therein that the same may conform to the record of the case in the Patent Office.

Signed and sealed this 11th day of September, A. D. 1934.

(Seal)  Acting Commissioner of Patents,
Leslie Frazer